July 5, 1938.  C. G. OLSON  2,122,915
THREAD FORMING FASTENER
Filed Nov. 12, 1936
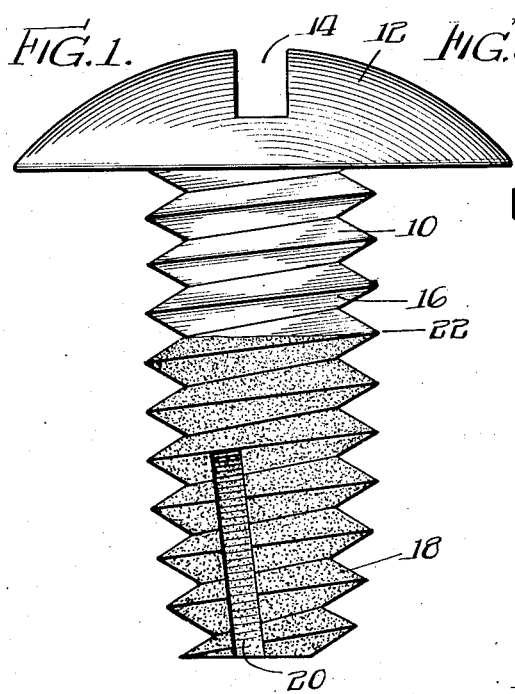
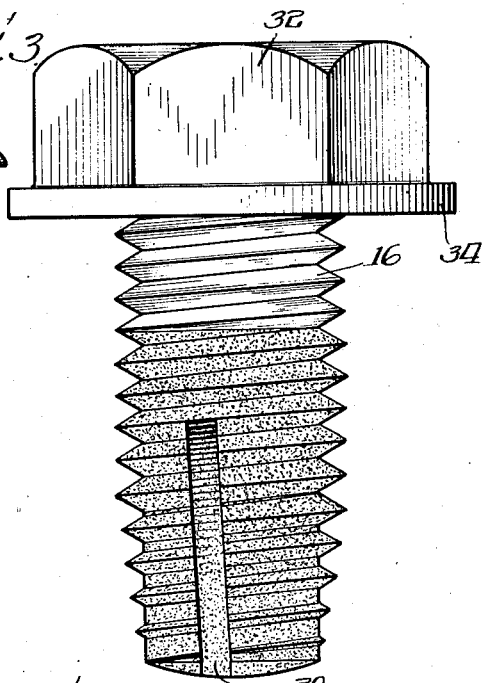
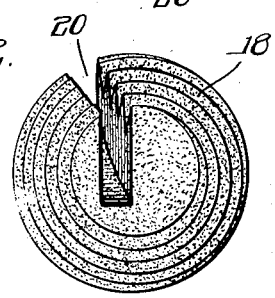
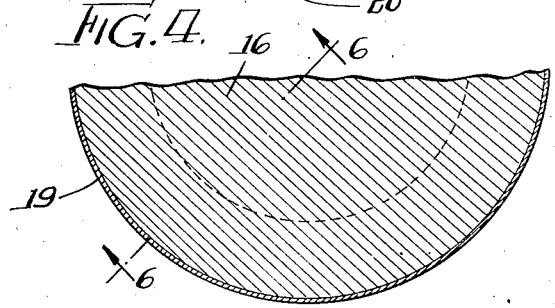
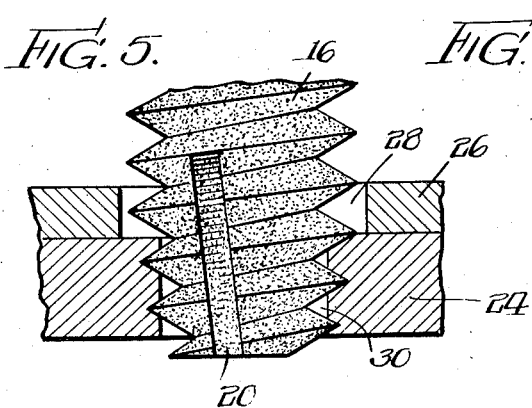
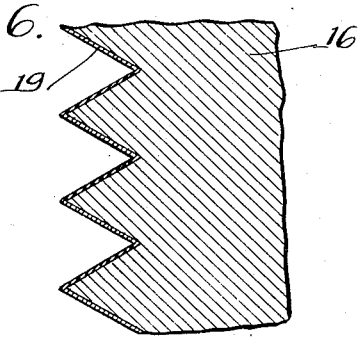
Inventor:-
Carl G. Olson
By:- Cox & Moore attys.

Patented July 5, 1938

2,122,915

UNITED STATES PATENT OFFICE 2,122,915

THREAD FORMING FASTENER

Carl G. Olson, Chicago, Ill., assignor to Illinois Tool Works, Chicago, Ill., a corporation of Illinois Application November 12, 1936, Serial No. 110,523

8 Claims. (Cl. 85—41)

This invention relates generally to fasteners and more particularly to fasteners which are adapted to form their own thread within an unthreaded aperture of a work-piece.

In operations involving the insertion of thread-forming fasteners into metallic structures, it is necessary to apply sufficient turning force to cut the metal or otherwise remove it from the path of the threads or the like. When it is attempted to drive fasteners of this type into a work material which is of the same metal as the fastener, the resistance to turning is sharply increased. The affinity of similar metals which causes this tendency to seize and resist turning of a fastener in the work material has been ascribed to the phenomenon of atomic proximity or chemical affinity of opposed metallic surfaces.

In the fabrication of structures from iron-carbon-chromium alloys which are highly corrosion-resistant materials, known as stainless steel, numerous obstacles have been encountered due to the fact that fasteners made of the same material could only be driven in place with great, if not insurmountable, difficulty. The effect of seizing or grabbing of the opposed stainless steel surfaces increased the resistance to driving to such an extent as to render assembly almost impossible and quite impracticable. To employ fasteners of the same or highly similar material is quite essential in view of the fact that it is frequently desired that the exposed portions of the stainless steel structure match in appearance and quality the exposed portions of the work-piece. Even the use of substitutes having similar appearance would not be suitable since the contrast would be apparent after a period of wear or exposure.

It is, therefore, an object of this invention to obviate the above difficulties by providing a fastener of non-corroding material which may be readily employed in a work-piece composed of the same or similar metal.

A further object of this invention is to do away with the tendency of a thread-forming fastener to seize or adhere when employed in work material of a similar nature.

An additional object of this invention is to permit the employment of stainless steel thread-forming fasteners in a stainless steel work-piece and attain uniform exterior appearance of the structure by providing the fastener with means to overcome the normal resistance caused by the mutual affinity of opposed stainless steel surfaces.

Numerous other objects and advantages will be apparent from a consideration of the following specification and drawing which disclose a few devices constructed in accordance with the principles of the present invention and in which Figure 1 is an elevation of the tapping screw made in accordance with the principles of the present invention;

Figure 2 is a fragmentary end view of the machine screw shown in Figure 1 with the head removed;

Figure 3 is an elevation of an alternative form of machine screw having a hexagonal head portion and an alternative type of entering thread structure;

Figure 4 is an enlarged sectional view taken at a point through the body of the threaded portion;

Figure 5 is a detail elevation showing the manner in which a tapping screw, of the type shown in Figure 1, is threaded into a work-piece to secure an outer member in position thereon; and Figure 6 is a fragmentary detail section taken on the line 6—6 in Figure 4.

The present invention is based upon the concept that the application of a relatively thin layer of a suitable metal to the bearing portions of a thread-forming fastener or the like, operates to decrease the tendency to seize in the case of identical or similar metals. Accordingly, a coating or plating of a metal having the desired low cohesive properties is provided on the work engaging surfaces only of the fastener.

The metal employed in the thin coating or plating is preferably, therefore, any metal which is so dissimilar in character to the metal composing the opposite work-piece as to decrease the coefficient friction. By the term "similar" metals or materials is meant those solid substances which are sufficiently similar to create the phenomenon of physical affinity caused by atomic proximity or the like, as explained above, and which involves generally, not only identical metals and other materials, but also those substances having such a similarity in structure as to be characterized by this effect. The above phenomenon is known to those skilled in the art and the substances characterized by its effect are either known or may readily be determined.

Tapping screws, the tapping portion of which is provided with a metallic coating, are shown in the drawing wherein 10 indicates a preferred form of structure provided with a relatively flat, circular head 12 having the conventional slot 14 for application of a screw driver or equivalent driving means. The threaded portion 16 of the fastener is of generally constant diameter at the central and upper sections, as shown in the figure, but the root diameter decreases at the leading end thereof to form a generally tapered thread-forming or tapping portion 18. A slot 20 traverses the lower tapered portion of the threads as is known in the art. According to the present embodiment, the screws are formed of stainless steel and adapted to fasten a stainless steel work-piece.

Metal of the type generally known as stainless steel is characterized by having metallic surfaces extremely resistant to corrosion, and is an alloy generally comprising iron, carbon and chromium in various proportions as is well known in the art and also with frequent small additions of nickel, molybdenum, tungsten and the like. The entire leading end of the threaded portion up to a transverse plane indicated at 22 is provided with a thin, even coating of cadmium 19 on the surface thereof, as disclosed in Figures 4 and 6.

In use, the screw may be driven in the conventional manner into a work-piece 24 in order to secure thereto an outer member 26. The outer member is drilled at 28 to provide an aperture of sufficient size to permit free passage of the threaded portion 16 of the screw 10 therethrough, while the work-piece 24 is drilled, or otherwise provided with a circular aperture 30 of only slightly greater diameter than that sufficient to accommodate the end of the screw.

In use, the tapping screw is passed through the aperture 28 and into the aperture 30, being rotated and driven in the conventional manner with the result that the inner sides of the latter opening are cut away to form threads with which the fastener engages, as shown in Figure 5.

In Figure 3 is disclosed an alternative form of fastener which, in use, operates on the principle of a screw threaded tapping fastener but in which the root diameter of the threads remains substantially constant throughout the length of the device while the threads decrease in height at the entering end thereof.

The head portion of the screw 32 is provided in conventional hexagonal form so that it is adapted to be engaged by a socket wrench or any equivalent driving means and is provided at its lower end, as shown in Figure 3, with a flange 34. This device is applied identically, as shown in Figure 5, and cuts its way into the fastening position in the same general manner.

Means may be employed to provide the metallic coating 19, such as dipping or electroplating the tips of the fasteners, the latter being preferred. A multiplicity of such tapping fasteners, for instance, may be so arranged or suspended that the desired area of the threads is projected into an electroplating bath for a sufficient period of time to accumulate a desired depth of coating.

While it is, for all practical purposes, ordinarily impossible to drive stainless steel screws of this type into similar work material, when using the above screws the normal seizing effect is obviated. In other words, this expedient makes possible the use of a screw in a relationship which could not otherwise be employed.

While the use of cadmium is disclosed in the preferred embodiment, various other metals may be employed in the coating, among which copper, tin and zinc have been used, as well as various alloys containing these ingredients. It will be obvious from this disclosure that any metals having the property of preventing seizing of the opposed portions of the work material will be suitable. This phenomenon will be enhanced if the metal coating employed is of relatively low tensile strength and/or has the property of flowing at the temperatures at which it is desired to work and which will maintain a generally continuous, unbroken surface during such use.

The above fasteners are particularly valuable in the manufacture of stainless steel vehicle bodies since the visible portions thereof are uniformly composed of the same type and appearance of stainless steel. At the same time the presence of the proper metallic coating on the thread-forming portions will permit the insertion of such a fastener into the material comprising the surrounding surface by the use of only a moderate turning or driving force. The invention, however, is not limited to the employment of the above work metals but is applicable when using fasteners in any metal wherein the above effect of seizing occurs. Other steels show intense affinity for fasteners of like material, a fact which is true of other metals, with few exceptions.

However, ordinary steels do not display this affinity for different types of steel. For instance, an ordinary hardened steel fastener may be driven into a soft steel work-piece without the difficulties outlined above.

It is thus apparent that such materials differ sufficiently in their chemical or physical structure in order not to show the above increased resistance to driving. On the other hand, it is, of course, understood that, in employing the instant stainless steel fasteners, the fastener must be of increased hardness over that of the work material to permit its proper function. The stainless steels employed for fasteners are, therefore, provided with some degree of hardness greater than that of the work material. The result is quite different than in the case of ordinary hard and soft steels, as above mentioned. Similarly the invention relates to the use of fasteners in all metals that are sufficiently similar to display the effect of increased resistance even though not identically the same in either structure or composition.

It is thought that the invention and numerous of its attendant advantages will be understood from the foregoing description, and it is obvious that numerous changes may be made in the form, construction and arrangement of the several parts without departing from the spirit or scope of my invention, or sacrificing any of its attendant advantages, the form herein described being a preferred embodiment for the purpose of illustrating my invention.

Having thus described the invention, what is claimed as new and desired to be secured by Letters Patent is as follows:

1. A thread cutting screw fastener formed of non-corroding material and adapted for use in a work piece of the same or similar material wherein physical seizing normally occurs, said fastener having a coating of a dissimilar metal on a threaded portion thereof, the fastener having normally exposed portions which are free from said coating.

2. A metallic thread forming fastener having a non-burrowing entering end, said fastener being formed of non-corroding metal and being adapted for use in a work piece of the same or similar metal wherein physical seizing normally occurs, said fastener having on its work engaging portions only a coating comprising a metal of repellant atomic nature to the metal of the screw, the fastener having a head portion which is free from said coating.

3. A metallic thread cutting screw fastener having a non-burrowing entering end, said fastener being formed of non-corroding metal and being adapted for use in a work piece of the same or similar metal wherein physical seizing normally occurs, said fastener having on its work engaging portions only a coating comprising a metal of repellant atomic nature to the metal of the screw, the fastener having a head portion which is free from said coating.

4. A metallic thread forming fastener having a non-burrowing entering end, said fastener being formed of a non-corroding metal and being adapted for use in a work piece of the same or similar metal wherein physical seizing normally occurs, said fastener having on its work engaging portions only a coating comprising a metal of repellant atomic nature to the metal of the screw, the fastener having a head portion which is free from said coating, said coating being of relatively low tensile strength and capable of readily flowing at ordinary temperatures.

5. A thread cutting screw fastener formed of non-corroding stainless steel and adapted for use in a work piece of the same or similar material wherein physical seizing normally occurs, said fastener having a coating on its entering end of a metal of the class consisting of copper, cadmium, tin, zinc, and alloys thereof, said fastener having a driving portion which is free from said coating and being adapted to be readily applied to the said similar work piece, while providing exterior surfaces of uniform character upon the finished structure.

6. A thread forming fastener formed of non-corroding stainless steel and adapted for use in a work piece of the same or similar material wherein physical seizing normally occurs, said fastener having a coating on its entering end of cadmium, said fastener having a driving portion which is free from said coating and being adapted to be readily applied to the said similar work piece, while providing exterior surfaces of uniform character upon the finished structure.

7. A thread forming fastener formed of non-corroding stainless steel and adapted for use in a work piece of the same or similar material wherein physical seizing normally occurs, said fastener having a coating on its entering end of a metal of the class consisting of copper, cadmium, tin, zinc, and alloys thereof, said fastener having a driving portion which is free from said coating and being adapted to be readily applied to the said similar work piece, while providing exterior surfaces of uniform character upon the finished structure.

8. A thread forming fastener formed of a non-corroding ferrous metal and adapted for use in a work piece of the same or similar material wherein physical seizing normally occurs, said fastener having a coating on its entering end of a metal of the class consisting of copper, cadmium, tin, zinc, and alloys thereof, said fastener having a driving portion which is free from said coating and being adapted to be readily applied to the said similar work piece, while providing exterior surfaces of uniform character upon the finished structure.

CARL G. OLSON.